United States Patent [19]

Scalzi et al.

[11] Patent Number: 4,521,846
[45] Date of Patent: Jun. 4, 1985

[54] MECHANISM FOR ACCESSING MULTIPLE VIRTUAL ADDRESS SPACES

[75] Inventors: Casper A. Scalzi, Poughkeepsie; Richard J. Schmalz, Wappingers Falls, both of N.Y.

[73] Assignee: International Business Machines Corporation, Armonk, N.Y.

[21] Appl. No.: 236,387

[22] Filed: Feb. 20, 1981

[51] Int. Cl.³ ............................ G06F 9/10; G06F 9/16
[52] U.S. Cl. ..................................................... 364/200
[58] Field of Search ... 364/200 MS File, 900 MS File

[56] References Cited

U.S. PATENT DOCUMENTS 3,938,096 2/1976 Brown et al. ........................ 364/200
4,044,334 8/1977 Bachman et al. ................... 364/200

Primary Examiner—Gareth D. Shaw
Assistant Examiner—Tim A. Wiens
Attorney, Agent, or Firm—Bernard M. Goldman

[57] ABSTRACT

The disclosure provides a general purpose register (GR) mask which associates predesignated address spaces with respective GRs assigned to contain a base value for calculating logical addresses within the address spaces. An address space mask register has a plurality of digit positions which receive the respective digit values comprising a particular GR mask. A respective digit position is selected by a base GR address signal provided by a storage address request from a CPU instruction decoder. The particular value of the selected digit in the mask register controls the selection among a plurality of STO registers, which designate a plurality of simultaneously available address spaces. The selected base GR is used in a System/370 B, D or X, B, D type of logical storage address representation. A base GR explicitly contains an intra-address-space base value. The GR mask assigns an implicit inter-address-space designation to the base GR in a simple manner which is handled by conventional address translation hardware. The available address spaces are respectively designated in STO registers by segment table addresses (called STOs). Any number of STO registers (and available address spaces) may be provided up to the radix of each digit in the GR mask. The executing program exists in the address space designated in one of the STO registers. A plurality of storage protect key registers are respectively associated with the STO registers to control the accessing authorized to the executing program within each available address space. The key value may be independently authorized and provided for each available address space. A cross-memory implementation results which enables a compatible extension of the IBM System/370 architecture by permitting the unrestricted use of all S/370 instructions including storage-to-storage (SS) instructions that can access data simultaneously in plural address spaces in nonprivileged state.

23 Claims, 8 Drawing Figures

FIG. 4 (NON-PRIVELEGED INSTRUCTION)
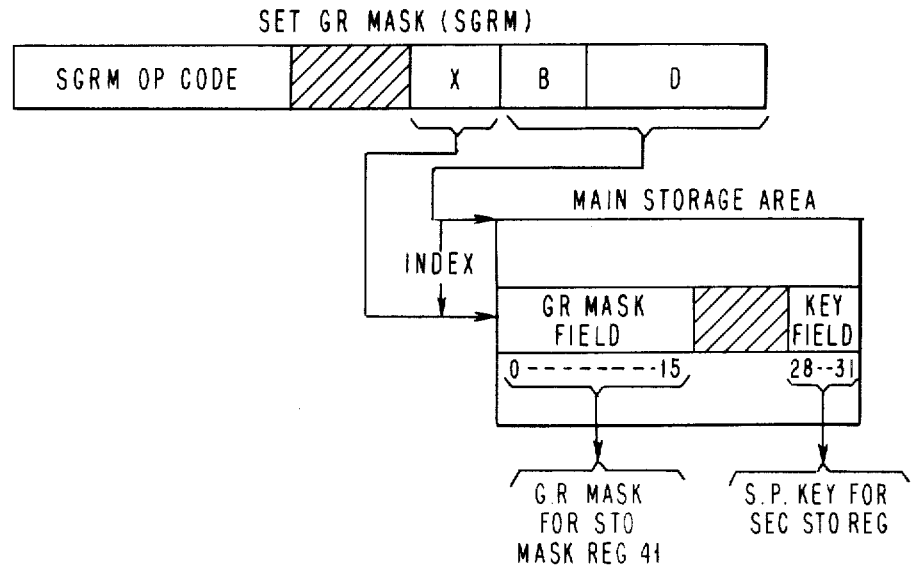
FIG. 5 (NON-PRIVELEGED INSTRUCTION)
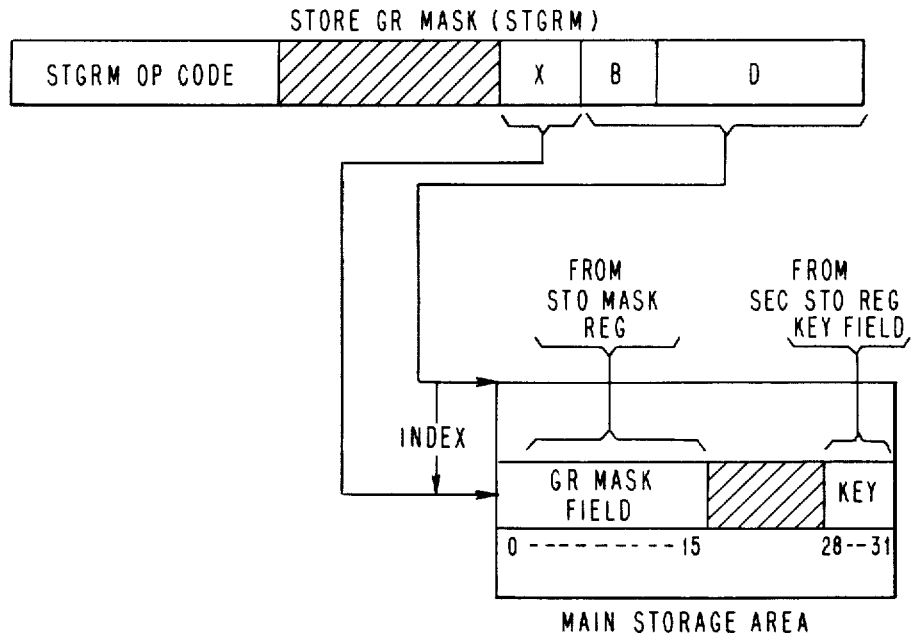

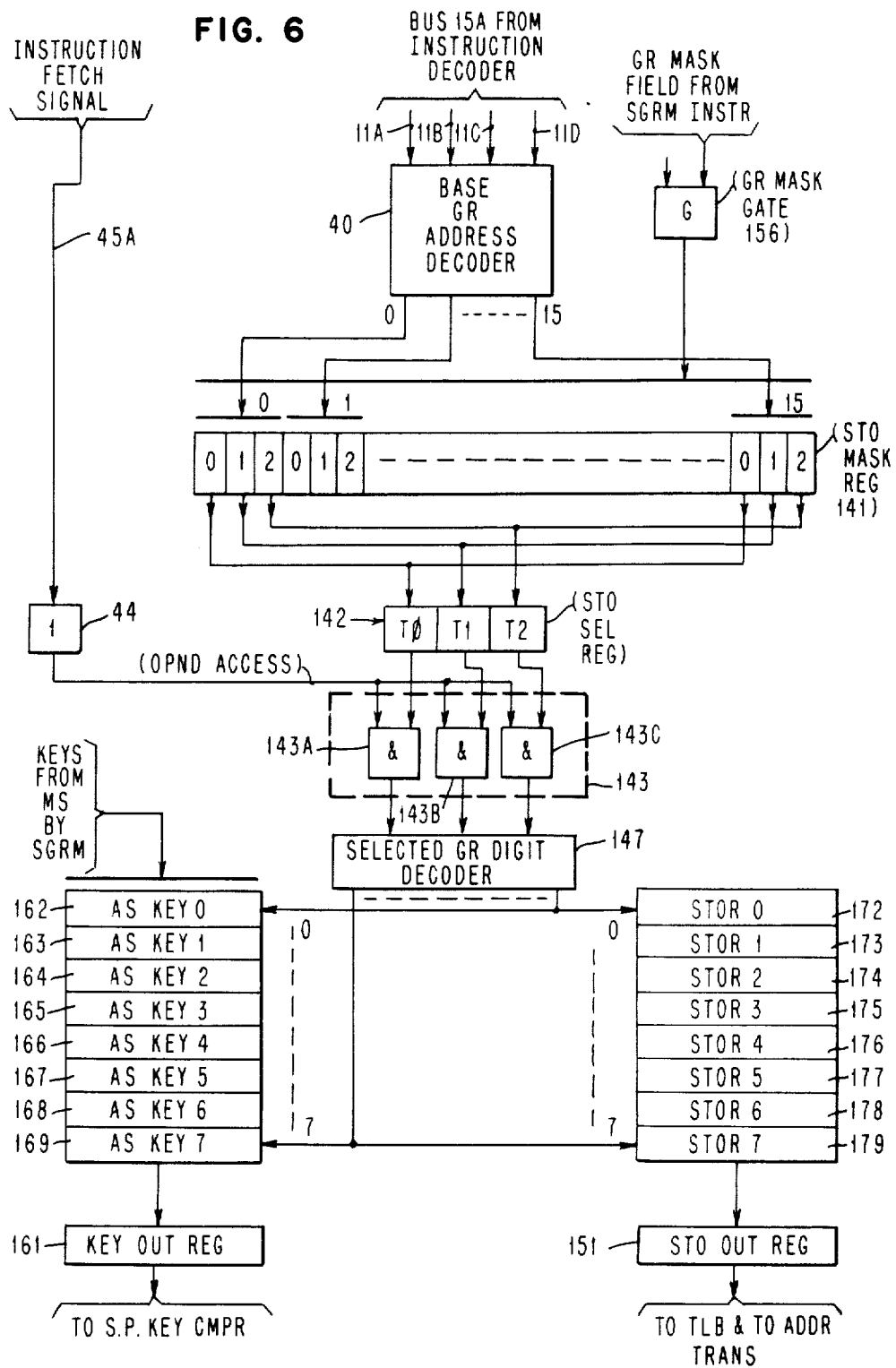

| 4,521,846 |

MECHANISM FOR ACCESSING MULTIPLE VIRTUAL ADDRESS SPACES

FIELD OF THE INVENTION

The invention relates to a method and means in a central processing unit (CPU) for enabling an executing program to have simultaneous addressability to two virtual address spaces.

DESCRIPTION OF THE PRIOR ART

Data processing systems supporting virtual addressing with multiple virtual address spaces are well known, such as the IBM System/370 CPUs supporting the multiple virtual storage (MVS) system control programming. Such systems define each address space as having a linear virtual addressability and obtain real main storage addressability by using segment tables in real main storage, in which each segment table defines the addressability for one address space. Each entry in a segment table may contain the real address of a page table when it is in main storage; and each page table entry defines a page in the virtual address space. A page entry is assigned the real address of an available page frame in main storage only when it is needed for the execution of a program. The system addressability of each address space is established by MVS software when a user logs-on or starts using the system by software assignment of an address space identifier (ASID). The system control program translates the ASID to a segment table descriptor (STD) which is loaded into a CPU control register when the program is dispatched, so that the STD can be used by the hardware to translate the virtual addresses of a program to execute in that address space. EAch STD contains a segment table origin (STO) field which locates the segment table for that address space in real main storage, and a field specifying the length of the segment table.

The 24-bit address in current IBM System/370 architecture can define a byte location within any STO specified address space to enable any address space to have up to 16 megabytes ($2^{24}$) of linear virtual addressability beginning at address zero. For a System/370 MVS system, thousands of address spaces are available. Different address spaces are generally assigned to different users of the system to obtain isolation between the users of the system, i.e. any user is only allowed system addressability within his own address space and is isolated from the address spaces of the other users by not knowing the ASIDs or STDs, and not having the authority to use the privileged system ability to load STDs into the hardware control registers other than his own STD. However, all address spaces in an MVS system have particular segments in the system defined to have the same 24-bit logical addresses which make the same MVS system control programs available to all users. The common segments may be defined to the CPU hardware in the manner described and claimed in U.S. Pat. No. 4,096,573 entitled "DLAT Synonym Control Means For Common Portions Of All Address Spaces" by A. R. Heller et al or U.S. Pat. No. 4,136,385 entitled cSynonym Control Means For Multiple Virtual Storage Systems" by P. M. Gannon et al, both assigned to the same assignee as the subject application. Hence, the common segments enable addressability to MVS in every address space in a system. Each user address space also has non-common (i.e. private) segments and pages which contain the user's application programs and data.

Different storage protect keys are assigned to the common and to the private areas to prevent the users in the private areas from accessing the privileged MVS programs and data in the common area. Software conventions in the assignment of storage protect keys and software locks (which must be honored by all programs) require that the private area programs execute in non-privileged state. Thus, a user's non-privileged application programs cannot directly access the privileged programs in the common pages in the user's address space, but he can communicate with such common programs by means of supervisory call (SVC) instructions. The result is isolation among non-privileged programs in the different address spaces, which are not allowed inter-space access but are permitted to have inter-space communication by calling for the intervention of the supervisory MVS programs in the common segments of each address space to do the inter-space communication between non-privileged programs in different address spaces. Significant programming overhead is involved in such inter-space communication.

A prior type of S/370 MVS cross-memory method enables inter-space communication in which a user in the private area of his address space receives a special authorization from a predetermined MVS software subsystem to directly communicate while operating in non-privileged mode, with another address space's private area controlled by the subsystem. After obtaining such authorization, the user can cause the loading of the other address space's STO into a second control register by specifying a special address space number (ASN) that identifies the other address space to the subsystem. Then the user in non-privileged state is allowed to use: (1) a progam call (PC) instruction which initiates a program execution in the other address space, and (2) data move instructions (MVCP and MVCS) which transfer data from one of the address spaces to the other. This S/370 MVS cross-memory method is obtained by the techniques described and claimed in patent application (PO9-77-022) having U.S. Ser. No. 152,919 filed 5/23/80 by A. R. Heller et al; patent application (PO9-80-010) having U.S. Ser. No. 152,889 filed 5/23/80 by A. R. Heller et al; and patent application (PO9-80-011) having U.S. Ser. No. 152,891 filed 5/23/80 by J. A. Cannavino et al, all being assigned to the same assignee as the subject application. None of these applications disclose any means for simultaneously relating different CPU general purpose registers (GRs) to different address spaces. Also, except for the MVCP and MVCS instructions (previously mentioned), these cross-memory communication methods do not permit plural operands in a single instruction (e.g. S/370 storage-to-storage instructions) to access different address spaces (which is obtainable with the subject invention).

The most pertinent prior art is a prior patent application entitled "Address Generating Mechanism For Multiple Address Spaces" having U.S. Ser. No. 131,570 filed 3/19/80 by the same inventors as the subject application and assigned to the same assignee as the subject application. That application associates the CPU's GRs (sometimes called GPRs) with respective access registers (ARs) and respective access register control vectors (ARCVs), in order to cause any GR to implicitly specify a unique address space and control how that address space is used. On the other hand, the subject invention uses a different inventive way to associate the plural GRs with two or more address spaces which can be simultaneously accessed for data by any one or more instructions executing in a particular address space. Application Ser. No. 131,570 and the subject application each provide different means for supporting concurrent accessing in plural address spaces in a way that obtains upward compatibility with the IBM S/370 system architecture.

The IBM Series/1 Data Processing System supports concurrent accessing in plural address spaces in a different manner from the subject invention. The Series/1 processor relates any source operand in an instruction to one address space, relates any sink operand in the instruction to a second address space, and relates the fetching of instructions to a third address space. On the other hand, the subject invention does not use the source or sink characteristic of an instruction operand to relate it to an address space. Instead, the subject invention implicitly associates any of plural address spaces with any of the general purpose registers (GRs) when they are explicitly used to contain intra-address-space base-address values. Thus, the subject invention can easily switch address spaces for any operand by a mask-bit reassignment of the GR used as an intra-space base register for that operand, without regard to the source or sink characteristic of the operand. The following patents owned by the assignee of the subject application relate to the address space control used in the IBM Series/1 architecture: U.S. Pat. No. 4,035,779 entitled "Supervisor Address Key Control System" by R. E. Birney et al; U.S. Pat. No. 4,037,207 entitled "System For Controlling Address Keys Under Interrupt Conditions" by R. E. Birney et al; U.S. Pat. No. 4,037,214 entitled "Key Register Controlled Accessing System" by R. E. Birney et al; U.S. Pat. No. 4,037,215 entitled "Key Controlled Address Relocation Translation System" by R. E. Birney et al; U.S. Pat. No. 4,038,645 entitled "Non-Translatable Storage Protection Control System" by R. E. Birney et al; U.S. Pat. No. 4,042,913 entitled "Address Key Register Load/Store Instruction System" by R. E. Birney et al; and U.S. Pat. No. 4,050,060 entitled "Equated Operand Address Space Control System" by R. E. Birney et al.

The concurrent accessing by a program of data in plural address spaces has been done by other prior art, such as described for the Multics operating system in U.S. Pat. Nos. 3,938,096 (J. L. Brown et al); 4,079,453 (J. N. Dahl); 4,084,228 (P. Dufond et al) and 4,177,510 (M. Appell et al). These patents describe a plurality of inter-address-space base registers (BRs) which can be used by either a user program or a system control program to explicitly specify virtual address spaces which can be accessed in main storage by an executing program (i.e. process) after translation into absolute addresses, in the manner required for supporting the Multics operating system. The BRs in these patents are not the same as S/370 GRs, since S/370 GRs do not contain address space identifiers which is one of the purpose of the Multics BRs. S/370 GRs are available to the non-privileged user to specify a byte address *within* an address space (i.e. S/370 type of intra-space non-privileged base register operation) or to contain data which can be manipulated therein. No means has been found in any of these Multics patents for having BRs implicitly designated by GRs, which is basic to the invention found in the subject application (and in previously cited application Ser. No. 131,570) that enable GRs to be directly associated with (but not to contain) address space designations.

SUMMARY OF THE INVENTION

The subject invention provides a GR mask register and controls which relate the digit positions in the mask register to the general registers (GRs) in a CPU, in order to control the selection among plural address spaces for accessing storage operands using a S/370 B, D or X, B, D type of logical address representation. In S/370 architecture, any GR except GR0 may be chosen as a B register to contain an intra-address-space base value. This invention permits any GR used as a B register (called herein a base GR) to be implicitly associated by the GR mask with any one of plural address spaces, so that an instruction's designation of a B register for an operand address is an implicit choice of an address space for that operand, whereby the content of the B register is then interpreted as residing within that address space.

An executing program may reside in any predetermined address space and access data from main storage in plural designated address spaces. A program may continuously execute in non-privileged state while it is accessing data in the plural address spaces, if before such program begins execution, the system control program operating in privileged state checks the authorization of the program and permits it to access any or all of such plural address spaces. After the authorization checking, the STDs of the plural address spaces can be loaded into required control registers. This type of address space control has the unique architecture advantage of providing a method and means of cross-memory implementation which is a compatible extension of the IBM System/370 architecture by permitting the unrestricted use of all S/370 instructions including storage-to-storage (SS) instructions that access data in plural address spaces.

Objects of this invention are to provide processor means:

1. To enable cross-memory communications in any IBM S/370 compatible processor without the need for any address space selection mode bit for the program status word (PSW).

2. To enable cross-memory communications in a S/370 compatible processor without the need for any special address space move instructions, by enabling the use of the prior S/370 SS move instructions, e.g. move long (MVCL), without any modification to move any required data directly between different address spaces, including directly between private segments and pages in different address spaces.

3. Which permits existing program compilers and assemblers to be used with only a slight modification needed to support cross-memory code generation.

4. With direct virtual addressability to data sets in plural address spaces, each of which may be directly addressed as a named collection with zero intra-address-space base value.

5. With simultaneous access to plural address spaces in non-privileged state.

6. Which is compatible with existing S/370 system architecture to permit the execution of both: prior programs designed for existing S/370 architecture, and for programs written to use the new architecture of the subject invention.

7. Which is easy to use in a direct manner by any progam by avoiding the need for program interruption, or for any special instruction to switch the accessing of data from one to the other of plural address spaces.

8. Which at any one time can have simultaneous access to data in an executing program's address space and in another address space.

9. With a unique mask register having a respective digit position corresponding to each general purpose register to associate any general purpose register with any of plural available address spaces.

10. Which allows any general purpose register (GR) containing an intra-address-space base value to be associated with any of plural selected address spaces.

11. To support relative byte addressing in each of plural accessible address spaces, each having up to $2^N$ linear byte addresses in which N is the number of bits in the effective virtual address.

12. That provides a new non-privileged instruction which can be used at any time to load a control register with a new GR mask to change the association of the GRs with plural designated address spaces.

13. With an addressing mechanism which need not connect any data address spaces to a program until the program is to be dispatched.

14. With an addressing mechanism which during execution of a program can have the program make and change the association of the GRs with plural designated address spaces.

15. Which allows the processor at any time to dispatch any program using the S/370 architecture, as well as at any time allows the processor to dispatch any program written to operate under the architectural change provided by the subject invention.

16. Which permits any operand request to access any of plural address spaces identified in plural control registers without the system hardware prescribing any relationship between any address space and the source or sink state of the requesting operand in an instruction.

17. Which permits any operand request to access any of plural address spaces designated by plural segment-table-address registers.

18. Which permits the execution of any S/370 storage-to-storage (SS) instruction having operands in different address spaces.

It is therefore a feature of this invention to provide access to data in either one or plural designated address spaces by an executing program without requiring any interruption in the execution of the program whenever it changes its accessing of data from one to the other of such address spaces. Furthermore, the program can execute any instruction having plural operands in different data spaces as easily as it can execute an instruction having one or more operands in a single address space. The program may access data in plural address spaces as easily in problem state as in privileged state.

It is another feature of this invention to enable a simpler implementation in the processor storage control unit and the processor instruction/execution units by requiring less hardware than may be required by the architecture described in the previously-cited patent application (PO9-79-012) having U.S. Ser. No. 131,570.

The invention provides a STO (segment table origin) mask register with means for associating its digit positions with respective general registers (GRs) in a data processor. The STO mask register may be loaded upon the dispatching of a program by the operating system, and it may be loaded at any time during the execution of the program in problem state when the program changes one or more base GR selections for the B-field in one or more following IBM System/370 type instructions. The address spaces are identified by loading the content of plural control registers with respective segment table origins (STOs) defining the absolute locations in main storage of the segment tables for the plural address spaces. The loading of the STOs into the plural control registers may be done in supervisory state, or in problem state with special authority. The executing program is required to be in the address space defined by the STO loaded into a predetermined control register. The program may be in an address space different from the data address space(s), or the program may be intermixed with data in its address space.

Thus, the invention can control which address space may be accessed for an executing program and operand data, and which other address space(s) may simultaneously be accessed for operand data by the executing program.

Furthermore, the above described arrangement is useable for executing current programs designed to run on IBM System/360 or System/370 architecture by merely having the operating system initially load the STO mask register with an all zero mask. Alternatively, a field in a program status word (PSW) or in a control register (which is a logical extension of the PSW) could be assigned to indicate whether the processor is running in conventional System/360 or System/370 mode or whether the processor is running in the cross-memory mode of this invention; and whenever the operating system sets this field to S/360 or S/370 mode it also sets the STO mask register to all-zeros. However, such special PSW indicator field is unnecessary with this invention, since the all zero/non-zero state of the STO mask register serves the same purpose.

A new non-privileged instruction (set GR mask) is also provided by this invention to load the STO mask register from any designated field in main storage, so that the user can control which of plural address spaces will be accessed by each base GR assigned by the user.

A non-privileged store GR mask instruction can store the current value in the STO mask register into any specified location in main storage, so that a user can inspect the current GR mask.

BRIEF DESCRIPTION OF THE DRAWINGS

FIG. 4 illustrates the form and operation of a set GR mask (SGRM) instruction.

FIG. 5 illustrates the form and operation of a store GR mask (STGRM) instruction.

FIG. 6 is a third embodiment of the invention showing its extension to handling up to eight simultaneously available address spaces.

BACKGROUND DESCRIPTION FOR THE EMBODIMENTS

Figure 1:
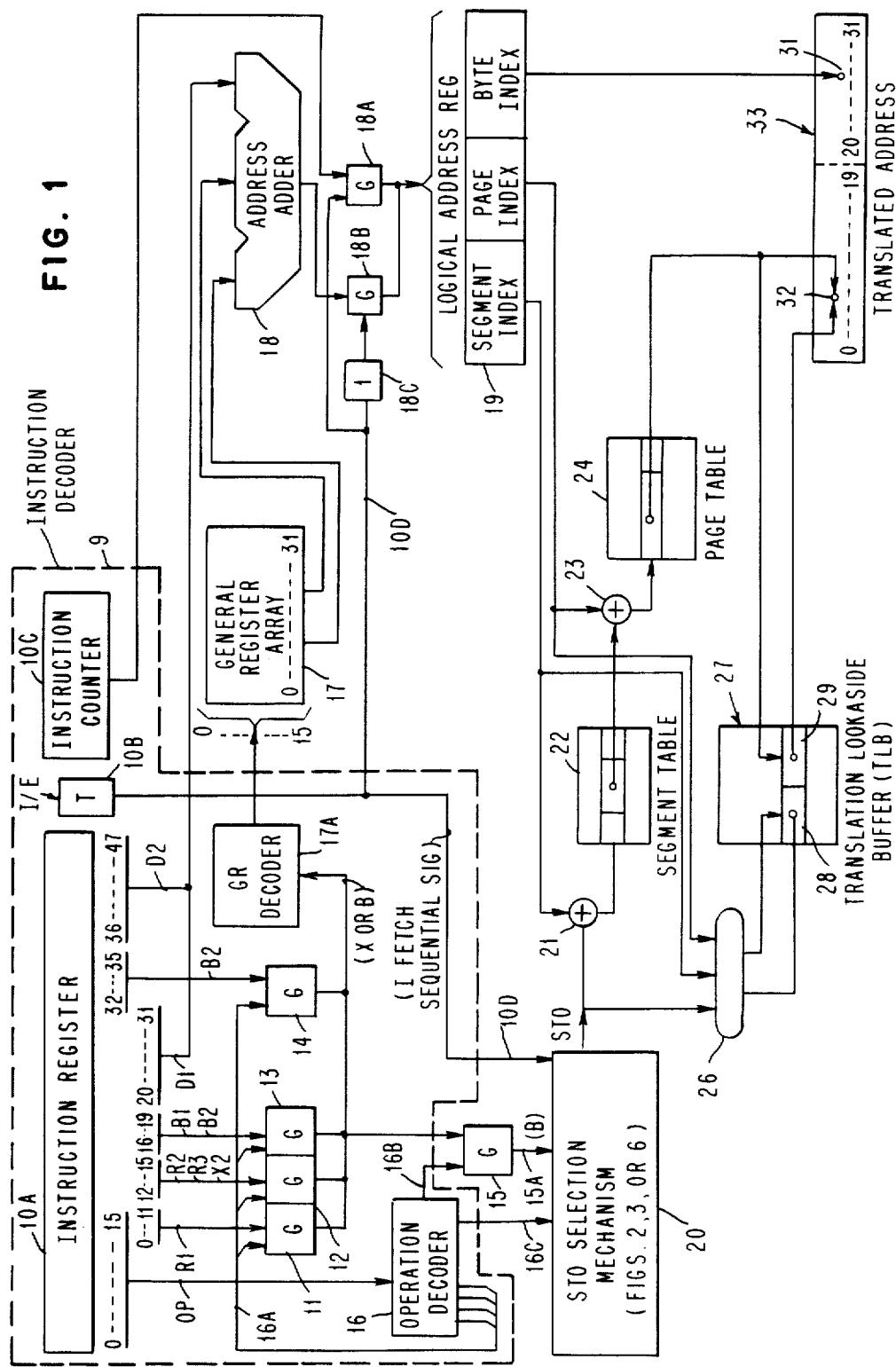
FIG. 1 shows the connection of background environment to the invention. The invention is represented therein as a segment table origin (STO) selection mechanism 20 which receives input signals from an instruction decoder and controls the selection of each STO for an otherwise conventional address translation means in a CPU.

FIG. 1 shows symbolically a conventional instruction decoder 9, such as may be found in any of a number of commercial CPUs such as an IBM 3033 processor. Decoder 9 can decode any of the IBM System/370 instructions. They have an operation code indicating the instruction length, type, and the location in the instruction of eah operand address, including the address of any general register (GR) containing an operand value or a component of an operand address, in accordance with the well known IBM S/370 system architecture. Thus, the operation code defines which fields in the instruction are GR fields, i.e. R, X or B fields. These GR fields are inputted to gates 11, 12, 13 and 14 which have another input from an operation field decoder 16, which signals on its respective output lines 16A when a GR operand field in the current instruction is an index (X) or base (B) field.

Operation decoder 16 sequences the GR fields when there is more than one GR designated in an instruction, so that only one GR address is outputted at any time from gates 11-14. The X and B field outputs of gates 11-14 are dot ORed on a four bit X or B address bus to a GR decoder 17A which addresses a general register array 17 which contains all sixteen GRs, commonly designated as GR0 through GR15 in any IBM S/360 or S/370 model CPU. The signal from decoder 17A thereby selects each required X or B designated GR in array 17. (The controls for selecting an R designated GR in array 17 are likewise well known and are not shown or discussed in detail herein because they are not important to this invention).

Figure 2:
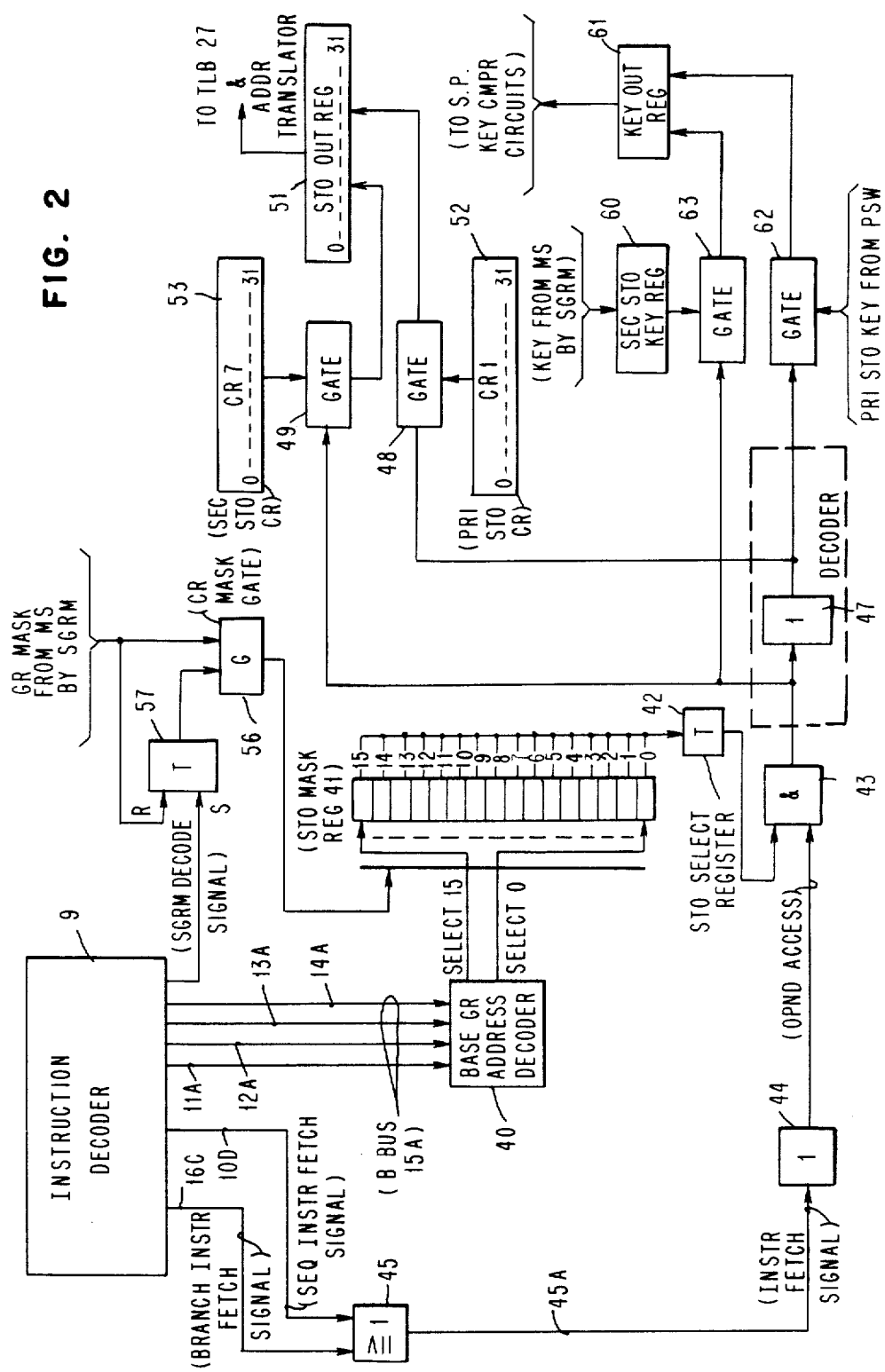
FIG. 2 is a preferred embodiment of the invention, including its storage protect key determination means.
Figure 3:
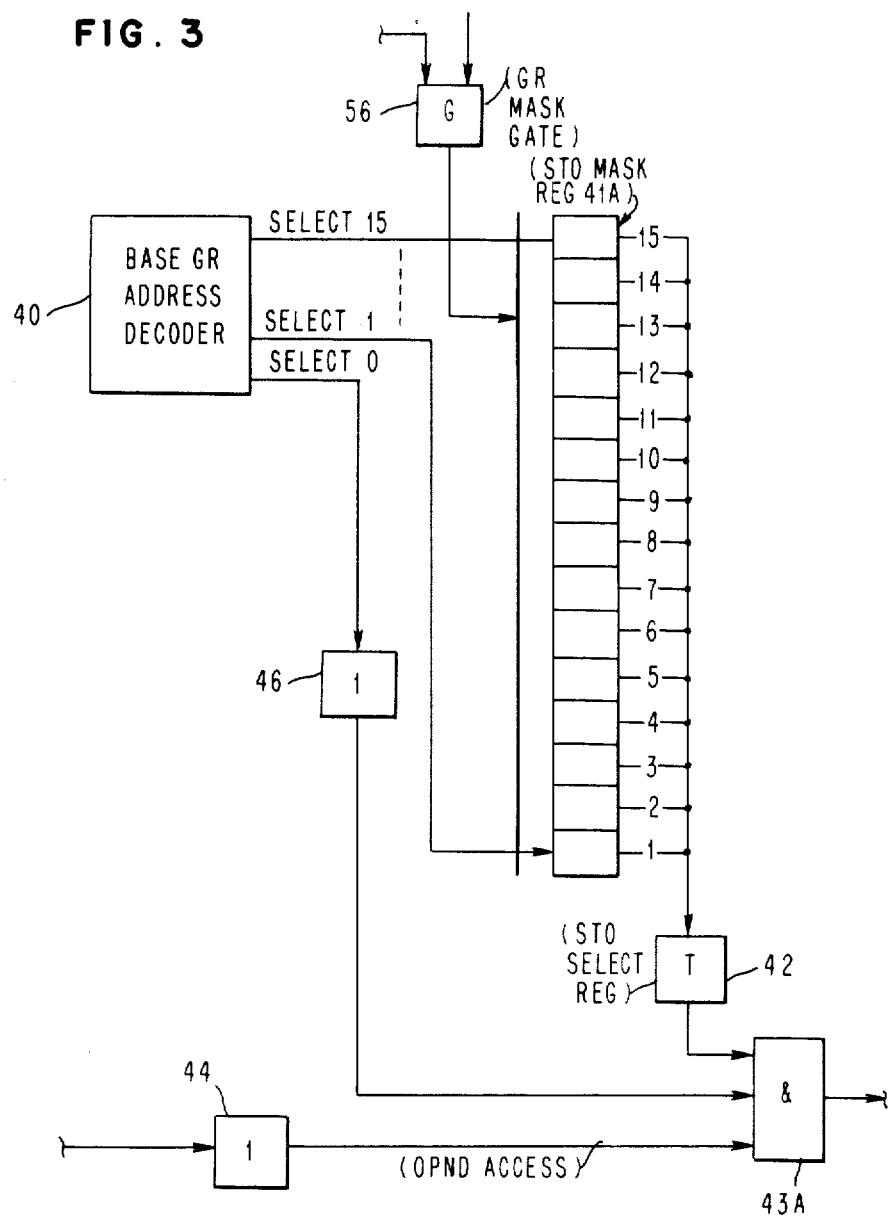
FIG. 3 is a second embodiment provided as a modification to the embodiment in FIG. 2.

The X or B address bus is also connected to a gate 15 which also receives an output 16B on which decoder 16 signals the existence of a B address for a base GR on the X or B address bus which then provides the B address through gate 15 to a STO selection mechanism 20, which may contain any of the novel embodiments shown in detail in FIG. 2, 3 or 6.

As mentioned, the X and B components of each operand's logic storage address are set into GRs in array 17 under control of instruction decoder 9 and along along with the related D field in the current instruction are sent to a conventional address adder 18 to generate each operand's effective logical address. Each effective logical address from adder 18 is provided through a gate 18B to a logical address register 19, which provides each logical address to a conventional address translation mechanism that contains a conventional translation lookaside buffer (TLB) 27 of the type implemented within the IBM System/370 M3033 processor which is often called a DLAT (directory lookaside address table). Gate 18B is enabled by an operand request signal on a line from an inverter 18C.

A sequential instruction fetch request is signalled on line 10D by an instruction access signalling trigger 10B which is set when the next sequential instruction address is to be accessed using the effective logical address in the instruction counter 10C. A gate 18A is enabled by a signal on line 10D to pass the instruction address to register 19. Also the signal on line 10D causes inverter 18C to disable gate 18B since no operand request then exists.

However, each branch instruction address is generated as an operand address in adder 18 and is passed through gate 18B, since a branch instruction address is the operand of a branch instruction using an X, B, D address.

The STO selection mechanism 20 outputs a real address in main storage, called a segment table origin (STO), and sends the STO to the conventional TLB and address translation mechanism. The translation mechanism adds the STO with the segment index from the logical address in register 19 to access a required page table origin (PTO) address in the segment table. That PTO and page index from logical address register 19 are added to obtain the required page table entry address. The page table entry provided bits 0-19 containing the real storage address of the required page frame in main storage, which is put into field 29 in a selected set-associative entry in TLB 27 and into field 32 in the translated address register 33. The displacement (D) field bits 20-31 are provided from instruction decoder 9 through adder 18 and register 19 to the byte index field 31 in the translated address register 33.

If the translation was previously done for a logical page address and is still valid in TLB 27, the TLB control means 26 compares the STO, segment index and page index to a set-associative TLB entry 28 to find the translated page frame address 29, which is immediately taken from TLB 27 and put into location 32 in translated address register 33, and the translation process using the segment table is then immediately terminated. If a previous translation is not available in TLB 27, the translation process is continued, requiring the storage accessing of the segment table 22 (addressed by the STO provided by mechanism 20) and the storage accessing of the page table 24 (accessed in storage through that segment table), using the segment and page indexes from logical address register 19.

DESCRIPTION OF THE PREFERRED EMBODIMENTS

A first embodiment of the STO selection mechanism 20 is shown in FIG. 2. It has a base GR address decoder 40 which receives the base GR address provided on lines 11A, 12A, 13A and 14A in B bus 15A from gate 15 in FIG. 1. Circuit 40 is a conventional sixteen way decoder, which receives the 4-bit combinatorial GR address as an input to activate one of sixteen output lines that corresponds to the base GR address selected on bus 15A.

In FIG. 2, a STO mask register 41 contains a sixteen bit GR mask in sixteen respective digit positions 0-15, each digit position having an input connected to a respective one of the sixteen outputs from decoder 40. Each digit position in register 41 in FIG. 2 contains a single bit. All sixteen output lines from register 41 are dot ORed to the input of a trigger 42, since only one of the sixteen positions in register 41 is outputted at any one time (because only one of the sixteen outputs of decoder 40 is active at any one time). Hence if a decoder line to register 41 is active, the corresponding digit position in register 41 is outputted and sets a trigger comprising a STO select register 42 according to the inputted digit state, which may be either 0 or 1.

An address-space controlling AND gate 43 receives an input from the output of register 42, and an input from an operand access control signal provided from the output of an inverter 44, which output is only active during operand requests. The input to inverter 44 is provided by an instruction fetch control signal from the output of an OR circuit 45 which receives the sequential instruction fetch indicating signal on line 10D, and also receives a branch instruction indicating signal from a line 16C provided by operation decoder 16 in the instruction decoder 9.

The effect of the output from gate 43 and an inverter 47 is to provide an address space selection decoder for the mask bit currently in STO select register 42 by activating one of the decoder output lines to a gate 48 or a gate 49, according to whether the register digit is 0 or 1, respectively.

Therefore, AND gate 43 provides a one or zero output signal which corresponds to the state of the selected mask digit while there is an operand request signal. An instruction fetch signal from OR circuit 45 causes the address-space-controlling gate 43 to provide only a zero output; the zero output is associated with an address space containing the program being executed.

In FIG. 2, the output of AND gate 43 controls which STO is provided to the TLB and address translation circuits in a STO out register 51. A zero output from gate 43 outputs the primary STO in a register 52, i.e. control register (CR)1, by enabling gate 48 via an inverter 47. A one output from gate 43 outputs the secondary STO in register 53, i.e. CR7, by enabling gate 49.

The STOs provide inter-address-space isolation protection between the non-privileged programs in the different address spaces in an operating system such as the IBM S/370 MVS. Storage protect keys are used to provide intra-address-space protection for the privileged operating system programs and various subsystem programs and data bases from the non-privileged user programs, when they are all operating within any single address space. The protect key being used by a currently executing program is in the program status word (PSW).

In FIG. 2, the storage protect key in a key out register 61 is the key currently used for accessing the address space determined by the STO in STO out register 51. The key in register 61 is provided for a current storage request by either a gate 62 or 63, depending on whether the request requires the primary or secondary STO. If gate 43 outputs a zero signal, gate 62 is enabled to provide the key from the current PSW to cause a current storage access into the CR1 primary address space. If gate 43 outputs a one signal, gate 63 instead provides the key from a secondary STO key register 60 to cause a current storage access into the CR7 secondary address space. The result is that the executing program may simultaneously have two PSW keys available which may be different in the two address spaces.

GR0 is defined in the IBM S/370 architecture as never being a base GR. A zero in the B field of an instruction specifies GR0, which always is interpreted as a zero base value, regardless of the actual content within GR0 (which content is ignored for address generation purposes but is available for the other GR uses). However, any of GR1-GR15 may at any time be designated in any B field of an instruction for its content to be used in the X, B, D generation of an operand's storage address.

The embodiment in FIG. 3 causes the primary address space to be selected whenever GR0 is specified as a B field. Therefore, if GR0 is selected in FIG. 3, the select 0 output from decoder 40 is activated to an inverter 46 which then provides an inhibit signal to AND gate 43A. forcing it to provide a zero output whenever the B field is zero. Consequently, the STO mask register 41A in FIG. 3 has fifteen digits 1-15, since the function of digit 0 is now performed by inverter 46.

The embodiment in FIG. 2 can be caused to operate in the same manner as the embodiment in FIG. 3 by setting digit zero in register 41 in FIG. 2 to a zero state.

In all other aspects, the embodiment in FIG. 3 is the same as the embodiment in FIG. 2. The result of this operation in FIG. 3 is to always force the primary STO from CR1 register 52 into STO out register 51 whenever zero is specified in the B field of an instruction.

While the executing program must always be in the primary address space defined by the STO in CR1 in FIG. 2 or 3, any address space in the system can be made the primary address space by loading its STO into CR1 register 52. Also, any address space in the system can be made the secondary address space by loading its STO into CR7 register 53. The loading of these CRs can be done by executing the privileged S/370 load control instruction or the unprivileged program call (PC), program transfer (PT), or set secondary ASN (SSAR) instructions described in the previously cited U.S. application Ser. No. 152,889.

An application-program user is normally only permitted to use non-privileged instructions and has his program execution stopped if he attempts to use a privileged instruction, in order to protect the integrity of the privileged programs and data in the system. Thus, an operating system generally does not allow the application-program to load the control registers, with the exception of the PC, PT and SSAR instructions previously mentioned because they have special authorization and protection characteristics built into them.

This invention allows an application program to use the entire S/370 instruction set to access any address space selected from a pre-authorized set of address spaces without the liability of executing a privileged instruction by using the unprivileged SSAR instruction to set CR7 to one of the address spaces pre-authorized to the user.

The user in non-privileged mode can at any time change his base GR assignment and correspondingly change the GR mask in STO mask register 41 (FIG. 2) or 41A (FIG. 3), as long as he is operating in the same two address spaces, such as when accessing a new page in either address space, in which case a base value is changed without changing the GR mask. Whenever a user program requires a change in the address space assignment of a GR, the user program executes a non-privileged set GR mask (SGRM) instruction (illustrated in FIG. 4), in which the X, B, D operand accesses a required GR mask field that was previously prepared in that X, B, and D location in main storage. That is, before a user program requires any base register assignment among the 16 GRs, it records in this X, B, D location a GR mask which assigns the two address spaces as required for the to-be assigned base GRs. The digit assignments in the GR mask can ignore the digit positions which are not assigned to base GRs, although a known future assignment of a base GR can be included to avoid having to later execute the SGRM instruction again for that assignment. Then the SGRM instruction is executed to load this GR mask into the STO mask register in the CPU from main storage to cause the assignment to happen.

The reassignment of any base GR to an R or X GR (either temporarily or permanently) does not require the execution of the SGRM instruction (or any special instruction). This is because whenever any GR is used as an R or X register, its GR mask digit is ignored, since any GR mask digit is effective only when the respective GR is being used as a base GR. Therefore any instruction can use any GR as an R or X GR for use in any address space, regardless of whether it has a GR mask digit assignment to a particular address space, which assignment is effective only when that GR is used as a base GR.

The GR mask digit for the B field in the X, B, D address can be changed when executing a SGRM instruction, since the new address space assignment for that base GR does not become effective until after the GR mask is loaded into register 41 (or 41A).

The initial loading of the GR mask must be from the program address space, i.e. primary address space; but thereafter the GR mask can be loaded from any specified address space.

The user program may at any time inspect its current GR mask in the STO mask register 41 (or 41A) by executing a non-privileged store GR mask instruction (STGRM), shown in FIG. 5, which stores the GR mask from register 41 or 41A into the X, B, D main storage location in this STGRM instruction.

Figure 7:
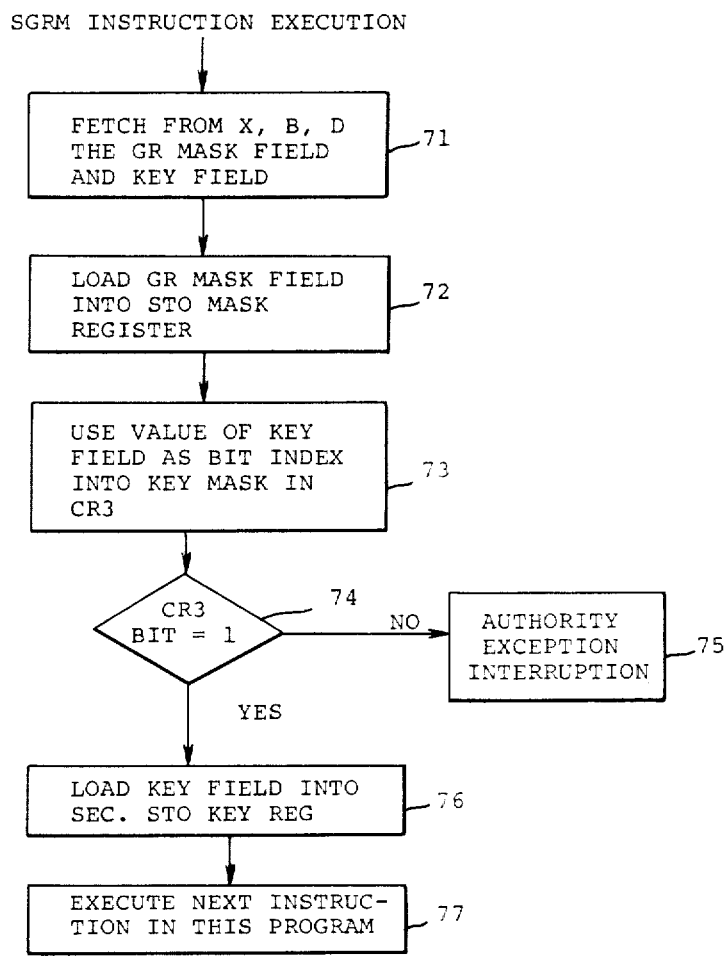
FIG. 7 is a flow diagram of the CPU execution of the SGRM instruction.

FIG. 7 illustrates in more detail the machine execution operations for the SGRM instruction. Step 71 fetches the field at the X, B, D location specified in the SGRM instruction. The fetched field contains a GR mask and a key for controlling accesses to the secondary address space. The GR mask is loaded into the STO mask register 41 by step 72. Then, step 73 uses the value of the four bit key field (which is between 0 and 15) as a bit index into a key mask (KM) in a control register (CR) as described in cited U.S. application Ser. No. 152,919 (regarding FIG. 3 in that application which describes the key mask as bits 0–15 in control register 3). The one bits in the key mask indicate the values of those storage protect keys which the privileged operating system or a subsystem has authorized for use by the non-privileged program executing the SGRM instruction. Step 74 tests the indexed bit in the control register key mask for a one or zero state. If this CR bit has a one state, step 76 loads the key field into register 60; and the execution of the SGRM instruction completes without interruption. Step 77 causes the next instruction in the same program to begin execution. If step 74 finds the CR bit is zero, the SGRM instruction key is not authorized, cannot be loaded, and the user program exits to step 75 that provides an authority exception interruption in the non-privileged program execution, which causes the privileged supervisor program to examine the cause of the interruption.

The CR7 STO defines a data address space, which is immediately accessible by any operand address in the executing program that uses a B field specifying a GR associated with the secondary CR7 address space in STO mask register 41 (FIG. 2) or 41A (in FIG. 3). The B field in any operand address may instead be associated with the primary CR1 address space to access data therein. Key match control is, of course, required for every storage access, except for key 0.

Thus, this invention allows the execution of S/370 storage-to-storage (SS) instructions which have two operand addresses in dual address spaces; that is, one operand address may have a B field associated with the primary CR1 address space and the other operand may have a B field associated with the secondary CR7 address space, and each operand may be controlled by a different key for its access. With this invention, dual address space SS type instructions can be executed without any CPU performance penalty.

Such dual address space SS instructions cannot be executed with some types of cross-memory architectures. For example, a prior art type of cross-memory architecture (such as in cited application Ser. No. 152,889) requires the execution of a special instruction called "set address space control (SAC)" to set a mode indicator in the PSW (program status word) whenever the accessible operand address space is to be changed. In such case, S/370 SS type instructions can only access the one address space currently designated in the PSW, except for the MVCP and MVCS special instructions. To perform a result equivalent to the dual-address-space SS instruction, such prior art architecture must execute a preceeding move-to-primary (MVCP) or move to secondary (MVPS) instruction, or a larger number of S/370 RX-type instructions while using the address space switching (SAC) instruction, which in all cases results in a performance penalty when compared to the subject invention. Comparative examples illustrating the architectural differences may be seen in the following instructions for performing a comparison between one word in the primary address space at byte location 32 with another word in the secondary address space at byte location 32.

With this invention, the SGRM instruction was previously executed once at the beginning of the program when it was assigning base GRs to assign CR1 to GR5 and to assign CR7 to GR12. The example for this invention is:

| Instruction Operation | Operand 1 | Operand 2 | Comment |
|---|---|---|---|
| COMPARE (CLC) | 32 (4,5) | 32 (12) | CR1 & CR7 Addr. Sps. |

(NOTE: Any following dual-address space SS or RX type instructions would not require the SGRM to be again executed as long as the designations for GRs 5 and 12 for the primary and secondary address spaces are not changed.)

The prior art architecture may use a MVCP instruction to move the compared word from the secondary address space to the primary address space, after which the CLC instruction may execute on both compared words in the primary address space, as follows:

| Instruction Operation | Operand 1 | Operand 2 | Comment |
|---|---|---|---|
| MVCP | 36 (4,5) | 32 (12),3 | GR3 contains the key for the CR7 address space access. |
| CLC | 32 (4,5) | 36 (4,5) | In CR1 address space. |

(NOTE: MVCP is a slow performing instruction, and it provides a temporary address space switching operation.)

Alternatively, the prior art architecture may use the SAC instruction to switch the operand address space, which would require a greater number of instructions to perform this same compare result, as follows:

| Instruction Operation | Operand R | Operand D (X,B) | Comment |
|---|---|---|---|
| SAC | Set Secondary | — | — |
| LOAD | 5 | 32 (0,12) | CR7 Addr. Space |
| SAC | Set Primary | — | — |

| Instruction Operation | Operand R | Operand D (X,B) | Comment |
|---|---|---|---|
| COMPARE (CL) | 5 | 32 (0,5) | CR1 Addr. Space |

(NOTE: Each time an instruction changes the address space for its storage operand, it must be preceded by a SAC instruction.)

Because this invention does not require any address space switching instruction, it thereby obtains greater compatibility with the S/370 object code generated by current high-level language compilers and assemblers which only need to be modified by inserting the SGRM instruction whenever a new base GR assignment is made in the code. It is common for existing compilers and assemblers to generate one object module with intermixed instructions, constants, literals, and variable data, and to generate another module without any instructions which can contain only constants and data spaces for variable data. With this invention, the second type module (data) can as easily be put in an address space different from the first type module (instructions and data) without any execution performance penalty. The prior art architecture would involve the additional performance penalty of executing the additional SAC, MVCP or MVCS instructions each time the instruction stream changed its operand address space because of not being able to execute dual address space SS type instructions. The architecture for this invention does not use the SAC, MVCP (move to primary), and MVCS (move to secondary) instructions and obsoletes the need for their existence.

Figure 8:
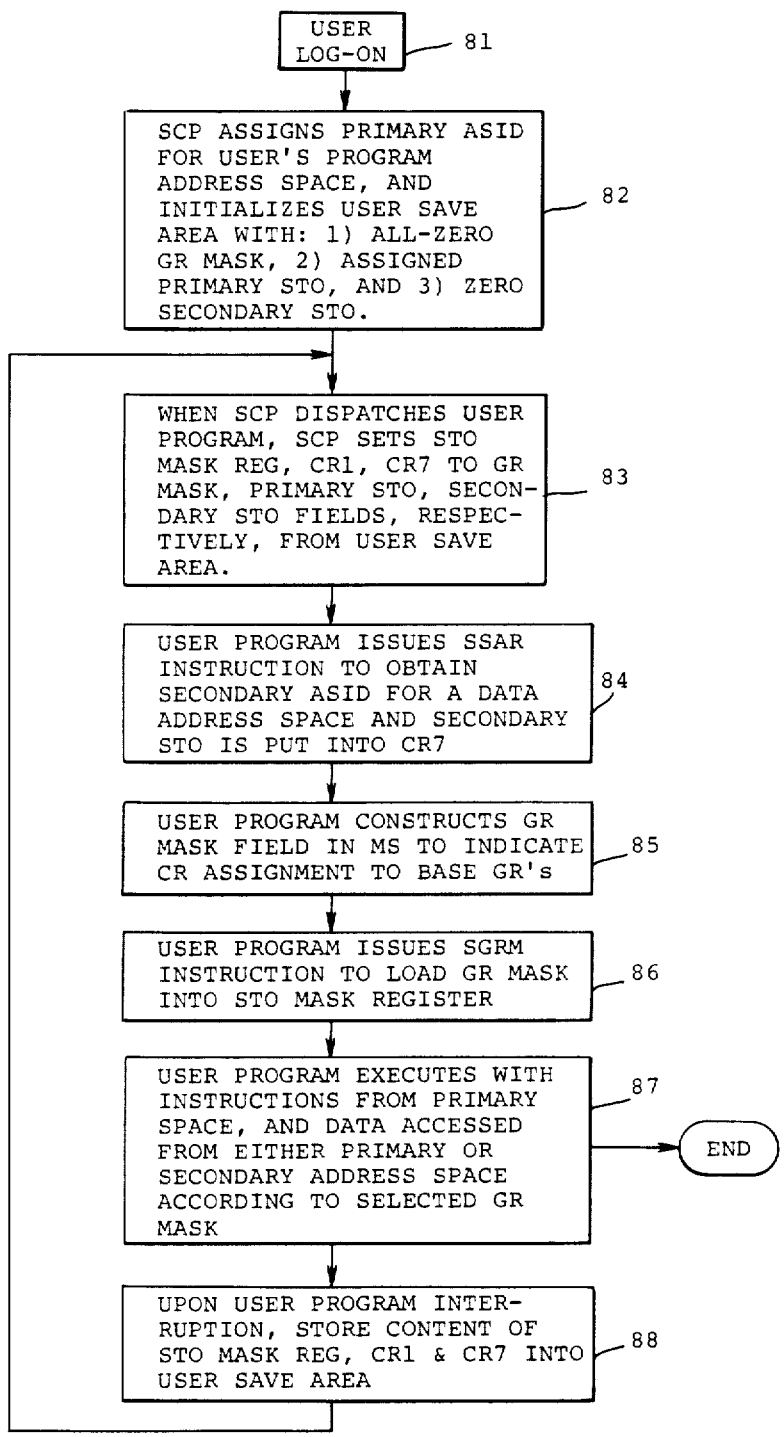
FIG. 8 is a flow diagram of the use of the STO selection mechanism.

FIG. 8 illustrates the general operation of this invention when using the embodiments in FIG. 2 or 3. Step 81 illustrates a user log-on to an interactive system (or the start of a batch job in the system). In step 82, the system control program (SCP) supervisor assigns a primary address space identifier (ASID) for the user program address space. Then, the SCP initializes the user save area and inserts therein an all zero GR mask and puts therein the primary STO which the SCP has at this time assigned to the user.

If the user program is in a ready state, it will be shortly thereafter dispatched by the SCP. In step 83, when the SCP dispatches the user program, the SCP accesses the user save area and transfers the all zero GR mask into the STO mask register 41 (or 41A), and transfers the assigned primary STO into CR1.

When the user program begins executing, if it wishes to access data in a secondary address space, it causes step 84 to issue a SSAR (set secondary ASN) instruction with an address space number (ASN) corresponding to the ASID for the secondary address space. A secondary STO associated with the secondary address space is then assigned and put into CR7.

In step 85, if the user program is to access the secondary address space, it constructs (or otherwise obtains) a GR mask in main storage which indicates how the user wishes to assign the address spaces to each base GR defined by the user program. In step 86, the user program issues a SGRM instruction to load the new GR mask into the STO mask register. It is noted that the new GR mask field need not be in the user save area, but may be in an area accessible by the user.

Then, in step 87, the user program executes in its normal manner with instructions from the primary address space and data accessed from either or both of the primary and secondary address spaces according to the GR mask in STO mask register 41 (or 41A).

Step 88 shows the consequences of an interruption of any type to the user program. It causes the SCP to store the content of the STO mask register, CR1, and CR7 into the user save area. When the program is again dispatched, step 83 is again entered, and the following steps repeat until the program is completed to end its operation in step 87.

FIG. 6 shows a third embodiment of the invention which supports up to eight simultaneously accessible address spaces, in comparison to the two address spaces simultaneously accessible in the embodiments of FIGS. 2 and 3. Because of the basic similarity between the structure of FIG. 6 and FIG. 2, the reference numbers used in FIG. 6 are the reference numbers used in FIG. 2 except that the reference numbers in FIG. 6 for similar but non-identical items have a high-order one digit prefixed to the reference number from FIG. 2. Thus, in FIG. 6, a base GR address decoder 40 may be identical to the base GR address decoder 40 in FIG. 2. Likewise, the 16 output lines from decoder 40 connect to the 16 digit positions in a STO mask register 141 in FIG. 6. Each digit position in the STO mask register 141 contain a three-bit digit instead of the one-bit digit found in register 41 in FIG. 2. In FIG. 6, each digit position in STO mask register 141 is identified by the bit positions 0, 1, 2. Hence, the digits have a radix of 2 in FIG. 2 and a radix of 8 in FIG. 6. Each digit in FIG. 6 is capable of assigning any one of eight address spaces to each of the 16 GRs assigned as a base GR, i.e. up to the value of the radix.

Therefore, STO select register 142 is a three bit position register which receives the three bits 0, 1, 2 in the digit corresponding to any GR currently being selected by decoder 40. Since only one digit is outputted at a time from register 141, the corresponding bit positions in each of the 16 digits in register 141 are dot-ORed to the respective inputs of STO select register 142.

A STO select gate 143 is provided by AND circuits 143A, 143B, and 143C for the respective three bit positions in the mask digit being currently provided from STO select register 142. Each of these AND circuits 143A–C receives a second input from the output of inverter 44 which provides a conditioning signal while an operand access is being requested by the instruction/execution unit, which correponds to no instruction fetch signal being then requested.

A selected GR digit decoder 147 receives the output of the STO select gate 143 and decodes the selected three bit digit into a single line signal which identifies one of eight STO registers corresponding to the particular base GR being signalled to mask register 141.

Eight different STO registers (STOR) 172 through 179 respectively receive the eight output lines from digit decoder 147, wherein one of the STO registers is activated by any particular setting of STO select register 142. Address space key registers 162 through 169 respectively correspond to the STORs 172 through 179 and contain the storage protect keys authorized to the currently executing program for accessing each address space defined in the corresponding STOR. Each of key registers 162–169 is enabled by the same output from digit decoder 147 which enables the corresponding STOR 172–179. The authorization process for the loading of keys into registers 162–169 may involve a different key mask (KM) for each address space to which the user is permitted to access.

A key out register 161 receives the key selected from a respective one of the eight key registers enabled at any given time by the output of decoder 147. Accordingly, the key contained in the key out register 161 corresponds to the STO contained in the STO out register 151 at the same time. The content of the key out register 161 is provided to storage protect key compare circuits (which may be conventional) in the storage control to check the access authorization of the current program into the address space being defined by the content of the STO out register 151 at the same time.

A GR mask gate 156 is provided to gate the GR mask field from main storage into the STO mask register 141 in response to the execution of an SGRM instruction. For FIG. 6, the SGRM instruction (as well as the STGRM instruction) accesses a 48 bit GR mask field and eight four bit key fields in main storage selected by the X, B, D location in the SGRM instruction, which are respectively loaded into STO mask register 141 and the key registers 162-169. The SGRM and STGRM instructions shown in FIGS. 4 and 5 have their fields expanded to include the 48 bit GR mask field and the eight keys, which require 80 bit positions.

It may be desirable to exclude the loadability of key zero via the address space key registers in FIG. 2 or 6, in view of key zero being restricted to the supervisor program. In this case, a zero content of any key field of the SGRM instruction can be interpreted by the hardware as either (1) not changing the content of the correspondingly loaded key register, or (2) invalidating the correspondingly loaded key register, e.g. by invalidating the STO in the corresponding STOR.

In FIG. 6, the address space containing the current instruction stream may be defined as using the STO in STO register 172 (which may correspond to CR1 in FIG. 2). The other seven STO registers 173-179 can then identify up to seven other address spaces which may contain data that is accessible to the program being executed in the address space identified by the content of STO register 172.

In all other respects, the operation of the embodiment in FIG. 6 is identical to the operation of the embodiment in FIG. 2 with the exception that the operands in any instruction can access the data in more address spaces (up to eight address spaces identified in the STO registers 172 through 179). Thus, the operations described in FIG. 8 also describe the operations for FIG. 6 with the modification in FIG. 8 that up to eight STOs, and their corresponding storage protect keys are being handled for the FIG. 6 operation (instead of only for the two address spaces described in FIG. 8).

It is therefore apparent that the radix of the digits in the STO mask register controls the maximum number of address spaces which are simultaneously accessible by the executing program. Thus, a radix of 4 (i.e. two bits per digit) will support up to 4 simultaneously available address spaces; and a radix of 16 (i.e. four bits per digit) will support up to 16 simultaneously available address spaces. Hence, the number of STORs and corresponding key registers will be adjusted to the value of the selected radix.

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. Addressing control means in a data processor having a predetermined number of general purpose registers (GRs), any of which may be assigned as a base GR to provide a base address within an address space, an instruction decoder in the processor for providing a base GR address signal that represents the GR address for one of the GRs which contains a base value for a calculation of an effective logical address of a storage operand of an instruction, comprising:

an address space mask register having a plurality of digit positions, the digit positions in the mask register corresponding to the respective GR addresses,
   a plurality of address space designating registers, each designating register having an address,
   means for loading one or more predetermined digit positions of the mask register with the address(es) of the designating registers to assign one of the designating registers to a particular GR,
   means for selecting a digit position in the mask register in response to a base GR address signal from the instruction decoder, the content of the digit position selecting the designating register assigned by the loading means to the digit position,
   whereby the GR address represented by the base GR address signal selects an address space designated by the content of the selected designating register.

2. Addressing control means as defined in claim 1, further comprising
   means for loading the address space mask register with a GR mask from a main storage.

3. Addressing control means as defined in claim 1, further comprising
   a base GR address decoder for receiving each requested base GR address signal from the instruction decoder, the decoder providing a separate output line for each GR address assignable as a base GR address, and
   the digit positions in the mask register being respectively selected by the separate output lines of the base GR address decoder.

4. Addressing control means as defined in claim 3, further comprising
   digit registering means for receiving the content of a digit position in the mask register enabled by the base GR address decoder, and
   address space decoding means receiving the digit stored in the digit registering means to generate an address space selection signal determined by the value of the received digit.

5. Addressing control means as defined in claim 4, further comprising
   each digit position in the mask register loadable with a binary digit, and the digit registering means being a bistable device,
   the address space decoding means further comprising: an address space decoding gate, and means for providing a true signal and a complementary signal from the decoding gate, and the decoding gate being enabled by one state of any digit received from the digit registering means,
   first and second address space designating gates, the first gate having one input connected to a first address space designating register and another input connected to the complementary signal from the address space decoding gate, and the second gate having one input connected to a second address space designating register and another input connected to the true signal from the address space decoding gate, and output address space designation means having inputs connected to outputs of both the first and second gates, whereby the output address space designation means identifies the address space to be accessed by a storage request providing the base GR address being handled.

6. Address control means as defined in claim 5, further comprising processor means for providing an operand request signal to an enabling input of the address space decoding gate.

7. Address control means as defined in claim 5, further comprising processor means for providing a sequential instruction fetch signal when requesting the accessing of the next instruction word(s)

the instruction decoder providing a branch instruction fetch signal when requesting the accessing of a branch instruction target word(s), and means for inhibiting the address space decoding gate by either the sequential instruction fetch signal or the branch instruction fetch signal, whereby any instruction fetch request forces the accessing of the request to be in the address space designated by a predetermined one of the address space designating registers assigned to the address space containing the program being executed.

8. Addressing control means as defined in claim 5, further comprising the base GR address decoder providing an output for indicating any of GRs 0 through N being selected as a base GR by an instruction, means for sensing a decoder output indicating the selection of GR0 as a base GR, means for inhibiting the output address space designation means, the inhibiting means being connected to the GR0 output of the base GR address decoder to prevent mask register control over the selection of an address space for a base GR0 output, whereby a selection of GR0 as a base GR by an operand request forces the access for the operand to be in an address space designated by a predetermined one of the address space designating registers assigned to the address space containing the program being executed.

9. Addressing control means as defined in claim 3, further comprising each digit position in the mask register being comprised of a plurality of bit positions, digit registering means for receiving a plural bit digit selected from the mask register by a base GR address signal provided from the instruction decoder, address space decoding means receiving the output of the digit registering means, and having a plurality of address space select lines respectively representing different possible values for any plural bit digit, whereby the address space select line activated by a particular digit value from the digit registering means controls the selection of one of plural address spaces which are simultaneously available to a logical address request from the processor for a storage access.

10. Addressing control means as defined in claim 9, further comprising means for respectively connecting the plurality of address space designating registers to the address space select lines from the address space decoding means.

11. Addressing control means as defined in claim 10, in which the number of address space designating registers is any plurality up to a predetermined radix for each digit position in the mask register.

12. Addressing control means as defined in claim 10, further comprising a plurality of storage protect key registers equal in number to the plurality of address space designating registers, and means for respectively connecting the plurality of key registers to corresponding address space select lines from the address space decoding means, whereby the selection of an address space designating register also selects a corresponding storage protect key register for providing a storage protect key which allows the processor to access into the selected address space at the requested address only if the access is authorized by that key.

13. Addressing control means in a data processor having a predetermined number of general purpose registers (GR's), any of which may be assigned as a base GR to provide a base address within an address space, an instruction decoder in the processor for detecting a base GR address signal for selecting one of the GRs to provide a base value for a calculation of an effective logical address of a storage operand, comprising:

a STO mask register having a plurality of digit positions respectively associated with the GR addresses, a plurality of address space designating registers, each capable of defining an assigned segment table address (STO) designating an available address space, means for selecting a digit position in the STO mask register by means of a base GR address signal provided by the instruction decoder, means for outputting the content of the digit position selected by the selecting means as the outputted address of a required designating register, means for accessing the required designated register with the outputted address of the selecting means, address translation means for receiving the STO defined by the required designating register to control the translation of a requested logical address to a real address in a main storage of the data processor.

14. An addressing control method in a data processor having a predetermined number of general purpose registers (GRs), any of which may be assigned as a base GR to provide a base address within an address space, an instruction decoder in the processor for providing a base GR address signal for selecting one of the GRs to provide a base value for a calculation of an effective logical address, comprising loading a plurality of digits in a GR mask from main storage into digit positions in an address space mask register, the locations of the digit positions in the mask register corresponding to the GR addresses, selecting a digit location in the mask register by a base GR address signal in a storage access request, and outputting the GR mask digit in the digit location, and decoding the digit provided by the outputting step to select one of plural address space designators to control the translation of the storage access request.

15. An addressing control method as defined in claim 14, further comprising
also outputting a storage protect key corresponding to the selected address space designator.

16. An addressing control method as defined in claim 14, further comprising
executing a store GR mask instruction by the processor,
transferring the content of the address space mask register to an operand location in main storage in response to the executing step,
whereby the current GR mask can be inspected in main storage by a user program.

17. An addressing control method for a processor operating in a multiprogramming system, the processor having a predetermined number of general purpose registers (GR's), any of which may be assigned as a base GR to provide a base address within an address space, an instruction decoder in the processor for providing a base GR address signal for selecting one of the GRs to provide a base value for a calculation of an effective logical address, comprising:
starting a user program on the processor by a system control program initially assigning a user address space identifier to provide a user with a program address space for containing the user program, and initializing a GR mask by assigning the program address space to all GRs, and assigning a segment table location in main storage to the program address space,
storing the GR mask and the segment table location in save area locations in main storage in relation to the user address space identifier for being accessible by the system control program,
whereby the user program may be executed by the processor whether the program uses only a single address space or plural address spaces, thereby providing processor compatibility with prior single address space programs.

18. An addressing control method as defined in claim 17, further comprising
dispatching the user program with the system control program executing the steps of: setting the GR mask into a mask register in the processor, and loading the user program's segment table location into one of plural segment table origin (STO) registers controlled by the GR mask in the mask register,
whereby the user program may execute in a single address space without the user program recognizing the existence of the GR mask or of any instructions supporting the GR mask usage to enhance the processor compatibility for old user programs.

19. An address space control method as defined in claim 18, in which the dispatched user program comprises the further steps of
issuing an instruction for loading another of the STO registers with another segment table origin to identify a data address space, and
executing a set GR mask instruction to load the mask register with another GR mask having a digit value which assigns the data address space to at least one base GR selected by the user to contain a base address for accessing data in the data address space.

20. An address space control method as defined in claim 19, further comprising
interrupting the execution of the user program, and
executing the system control program to store in the user's save area locations the GR mask currently in the mask register and the STO's currently in the STO registers,
whereby the user program can automatically start executing from a point of interruption caused by the interrupting step upon the next redispatch of the user program.

21. An address space control method as defined in claim 20, the redispatch of the user program further comprising
executing the system control program to access the user's save area locations and load the last saved GR mask into the mask register and the last saved STO's into the same STO registers from which the STO's were last stored.

22. An address space control method as defined in claim 19, the user program further comprising
providing a GR mask in a field in main storage having one mask digit assigned to one base GR having an immediate use and having another mask digit assigned to another GR which is to be later used as a base GR in the execution of the user program,
executing a set GR mask instruction to load the mask register with the GR mask from the field in main storage,
whereby any GR may be used for any GR purpose; and whenever a GR is used as a base GR, the GR mask provided by the last executing step automatically causes a storage access using a base GR to access a corresponding address space assigned in the mask register.

23. An address space control method as defined in claim 19, the user program further comprising
changing the base value in any base GR without changing the GR mask in the mask register when no change is required in the address space assignment for this base GR,
whereby any base GR may at any time be used for any GR purpose (including for containments of index and operand values) as long as a required base value exists in any base GR while it is used for generating a required storage address.

* * * * *